Figure 1:
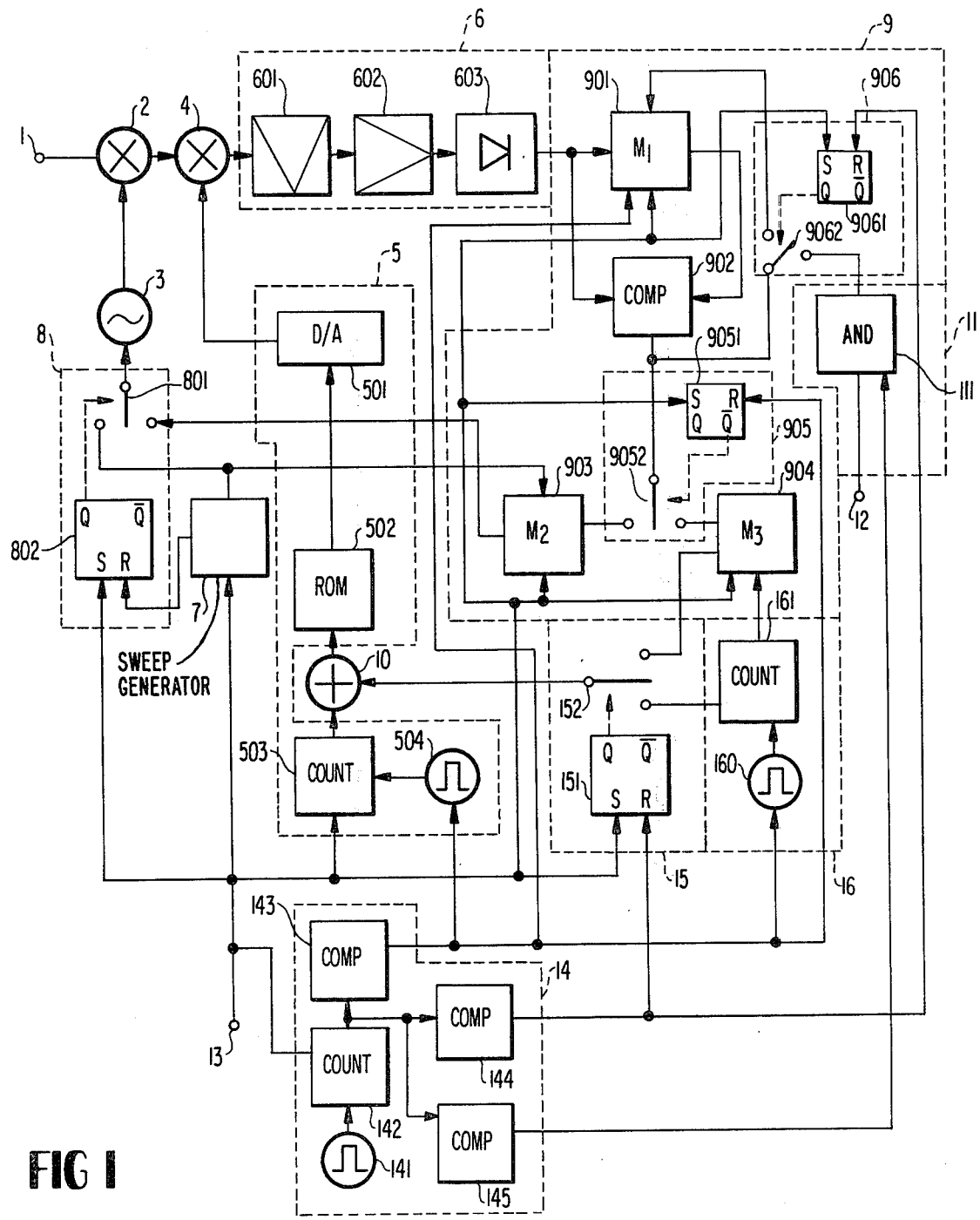

United States Patent [19]

Matsuo et al.

[11] 4,168,398
[45] Sep. 18, 1979

[54] INITIAL ACQUISITION SIGNAL DETECTION SYSTEM FOR TDMA SATELLITE COMMUNICATION

[75] Inventors: Yoshio Matsuo; Junji Namiki; Yukitsuna Furuya, all of Tokyo, Japan

[73] Assignee: Nippon Electric Co., Ltd., Tokyo, Japan

[21] Appl. No.: 849,581

[22] Filed: Nov. 8, 1977

[30] Foreign Application Priority Data

Nov. 10, 1976 [JP] Japan .................................. 51-135679
Nov. 10, 1976 [JP] Japan .................................. 51-135680
Nov. 11, 1976 [JP] Japan .................................. 51-136042

[51] Int. Cl.$^2$ ............................................. H04L 7/10
[52] U.S. Cl. .............................. 178/69.1; 179/15 BS
[58] Field of Search .................... 325/4, 35, 63, 131; 178/69.1; 179/15 BS, 15 BF; 340/146.1 D

[56] References Cited

U.S. PATENT DOCUMENTS

| 3,909,541 | 9/1975 | Boblin .......................... 179/15 BS |
| 3,974,333 | 8/1976 | May, Jr. et al. ................. 178/69.1 |

*Primary Examiner*—Benedict V. Safourek
*Attorney, Agent, or Firm*—Sughrue, Rothwell, Mion, Zinn and Macpeak

[57] ABSTRACT

A low level initial acquisition signal consisting of a continuous wave signal portion followed by a phase-modulated signal portion is transmitted via a satellite to a receiving station. The received CW signal is converted by a voltage-controlled variable frequency local oscillator to an intermediate frequency signal which is fed to a narrow passband filter. The local oscillator frequency is linearly swept, and the maximum signal passing through the filter during one sweep is detected. The local oscillator is then locked at the local frequency which produced the maximum signal, thereby effecting frequency acquisition. Next, the phase-modulated signal portion is multiplied by a phase-modulated signal output from a variable phase local signal generator. The phase of the local generator is also swept, and the maximum phase correlation signal passing through the band pass filter is again detected, and the phase of the generator output is corrected by the phase shift which produced the maximum phase correlation signal. This phase shift is used as a basis for determining the proper timing for acquisition of the correct time slot in the TDMA frame at the satellite for a transmitted data burst. The acquisition is confirmed by comparing the maximum phase correlation signal obtained during phase sweeping with the signal level obtained after the phase of the generator has been locked.

7 Claims, 4 Drawing Figures

(a)

(b)

(c)

(d)

(e)

INITIAL ACQUISITION SIGNAL DETECTION SYSTEM FOR TDMA SATELLITE COMMUNICATION

The present invention relates to a phase acquisition circuit for an initial acqusition signal in TDMA (time-division multiple-access) satellite communications, and more particularly to a detection system for such a signal.

In a TDMA satellite communication system, each earth station must insert its own burst signal at predetermined time slots for each frame. However, in the TDMA satellite communication, the distance from an earth station to the satellite varies due to variation of the satellite position. Accordingly, when an earth station which has been out of communication is caused to start a communication, the propagation delay of an electromagnetic wave up to the satellite is not known because a correct estimation of the distance from it to the satellite cannot be made. As a result, it becomes impossible for the earth station to insert its burst signal at the predetermined time position for each frame viewed at the satellite.

As one approach to the solution of this problem, the following investigation is now in progress. Namely, for initial acquisition, an initial acquisition signal is transmitted to the satellite at a sufficiently lower level than a normal burst (data) signal level so as not to interfere with other earth stations, thereafter at the transmitting station a propagation delay from that station to the satellite is estimated from the phase of a received signal, and then, a data signal at the normal level is transmitted with the shifted transmission phase based on the estimation. In this approach, since the transmission of the data signal at the normal level at false time slots will cause interference with other stations during communication, such interference must be avoided.

As described above, the transmission of the initial acquisition signal at the low level and superposed on the normal burst signal lowers the signal-to-noise ratio, resulting in the state where it is necessary to pick up the acquisition signal buried in noise. In addition, the low level initial acquisition signal superposed on the high level burst signal tends to suffer from level suppression because of the saturation characteristics of the amplifier on the satellite. On the other hand, since an initial acquisition signal not superposed on a burst signal is not subjected to the above-mentioned level suppression, the received initial acquisition signal can undergo a wide level variation, depending upon the communication states of the other stations.

Conventional methods employed for frequency acquisition under the above-mentioned conditions are a method making use of a narrow-band band-pass filter and a method utilizing a phase lock circuit. The former method makes frequency detection possible with an improved signal-to-noise ratio (S/N) by sufficiently narrowing the band width under the condition that the frequency of the initial acquisition signal is preliminarily known with high precision. However, if its frequency varies over a broad range and a filter is used, the extension of the band width of the filter exceeding the range of variation can not be avoided, thereby resulting in an insufficient S/N ratio.

Likewise, for the phase lock circuit, if the band width is narrowed, a broad pull-in range cannot be chosen, with the result that a broad frequency range cannot be covered. This tendency becomes more significant as input noise increases.

One approach for solving these problems, involves searching for an initial acquisition signal by sweeping a pass-band center frequency of a narrow-band filter. An equivalent approach can be achieved through a method in which an input frequency is frequency-converted by employing a frequency sweep signal as a local signal, and then, the converted output is passed through a fixed narrow-band filter. Furthermore, when a phase lock circuit is used, a method is practiced in which the frequency of the voltage-controlled oscillator (VCO) is swept.

For the aforementioned method of sweeping the frequency of the VCO, reference is made to publication, "Phase Lock Techniques" pp. 50-51, and published in 1966 by John Wiley & Sons, Inc.

However, these methods have various disadvantages. Stated in detail, the discrimination between a desired input signal and an interference wave is generally difficult so that there is a concern that the phenomenon of so-called false synchronization may occur in which synchronization is locked by the first interference wave during a sweep. Also, even if there is provided protecting means such that the locking may occur only when a signal at a higher level than a predetermined level has been detected, the methods become ineffective if the input signal level and the interference signal level are not determined.

In the conventional methods of phase acquisition, in order to achieve the phase acquisition of a signal series in which a known pulse pattern is inserted at specific positions for the purpose of synchronization, a waveform generator for generating the same known pulse pattern is provided on the receiver side, and the output phase of this waveform generator is controlled in such a manner that if a correlation quantity between said signal series and the waveform of said waveform generator exceeds a threshold value defined between the maximum value of the correlation quantity obtained when both are perfectly synchronized and the minimum value of the correlation quantity obtained when both are not synchronized at all, the variation of the output phase of said waveform generator is stopped to bring the signal series and the waveform of said waveform generator into synchronism. According to this prior art method, a very simple synchronizing apparatus can be constructed in the case where the level of the input signal series is stable, and, when the signal series is not synchronized with the waveform generator on the receiver side, said correlation quantity does not become too large. However, for an input signal series not satisfying the above-mentioned two conditions, said synchronizing apparatus causes many wrong operations. In other words, the determination of a fixed threshold value for said correlation quantity for determining the synchronized condition becomes difficult.

One object of the present invention is, therefore, to provide a TDMA initial acquisition signal detection system which is free from the above-mentioned disadvantages of the frequency acquisition and the phase acquisition methods in the prior art, and which employs a frequency acquisition circuit and a phase acquisition circuit that can operate quickly and correctly even under unfavorable conditions which produce a poor S/N ratio and which are signal level variation and the presence of an interference signal, and/or also jointly employs an acquisition confirmation circuit adapted to further reduce the probability of a burst signal transmission at wrong time slots within a frame because of an error in the frequency acquisition or phase acquisition.

The present detection system comprises: a frequency acquisition circuit in which, in order to acquire a desired intermediate frequency derived from a TDMA initial acquisition signal, the level of said desired intermediate frequency is detected while sweeping a local oscillation frequency, said local oscillation frequency is stored at the moment when said level has its maximum value, and after the completion of the sweep of said local oscillation frequency, the oscillation frequency of the local oscillator is returned to the stored local oscillation frequency; a phase acquisition circuit including correlation means for detecting a mutual correlation quantity between an input periodic waveform of said TDMA initial acquisition signal and an output waveform of a waveform generator for generating the same periodic waveform as said input periodic waveform to detect a phase difference between said input periodic waveform and the output waveform of said waveform generator, phase shift means for varying the output phase of said waveform generator, detection means which can simultaneously detect both the maximum value of an output signal obtained from said correlation means and also the phase shift quantity which produces that maximum value when the phase has been shifted by one period or more by said phase shift means, and means for correcting the phase of said waveform generator by said phase shift quantity, whereby the phase error between said input periodic waveform and the output waveform of said waveform generator is estimated on the basis of said phase shift quantity, and the phase acquisition synchronized with said input periodic waveform is performed by correcting the phase of said waveform generator by said phase shift quantity; and an acquisition confirmation circuit in which, upon completion of said phase acquisition, a comparison is made between (1) the maximum level detected by said correlation means during the phase shifting effected by said phase shift means multiplied by a predetermined factor and (2) the output level of said correlation means after said phase acquisition, and if the output level (2) of said correlation means is determined to be higher, the phase acquisition is confirmed, resulting in the generation of an acquisition confirmation signal.

The operation principles of the frequency acquisition circuit and the phase acquisition circuit used in the present detection system will now be described below. An important feature of the operation principles is the fact that a parameter of a local signal on the receiver side is swept over a predetermined range, the degree of the similarity between the local signal and a received signal is detected at every time point, the value of the parameter which has given the maximum value of the degree of the similarity within the swept range is stored, and after the completion of the sweep, the parameter of the local signal is set at the stored value.

Here, the term "parameter" means a frequency or a phase. With regard to the degree of the similarity, in the case of the frequency acquisition, the nearness of the frequencies of the received signal and the local signal (representing the maximum value when the both frequencies coincide with each other) serves as one measure, while in the case of the phase acquisition the magnitude of the mutual correlation between those signals serves as a measure.

According to such an acquisition method, the acquisition can be achieved precisely without any an adverse influence due to level variation, because the maximum value of the degree of the similarity between the received signal and the local signal is detected.

Figure 2:
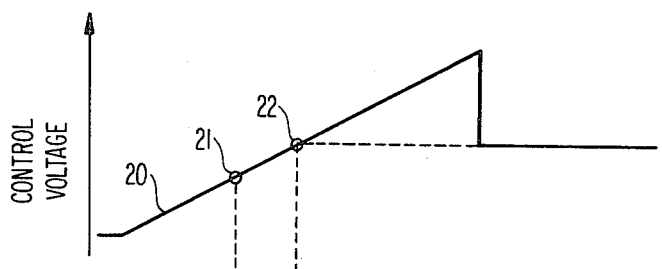
Figure 2:
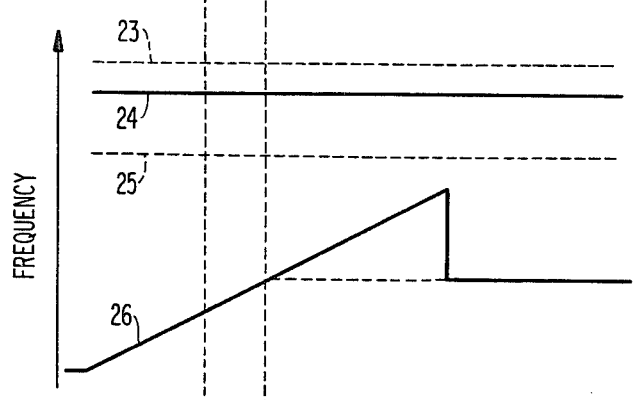
Figure 2:
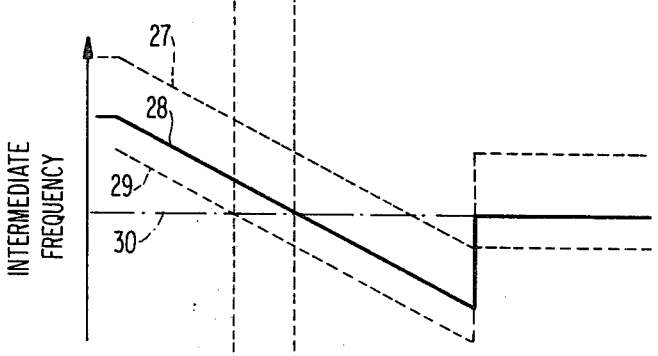
Figure 2:
Figure 2:
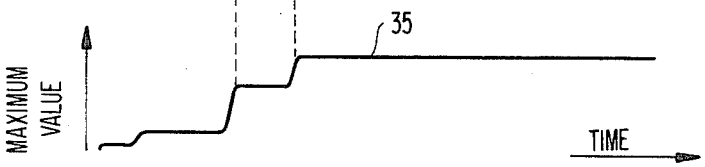
Figure 3:
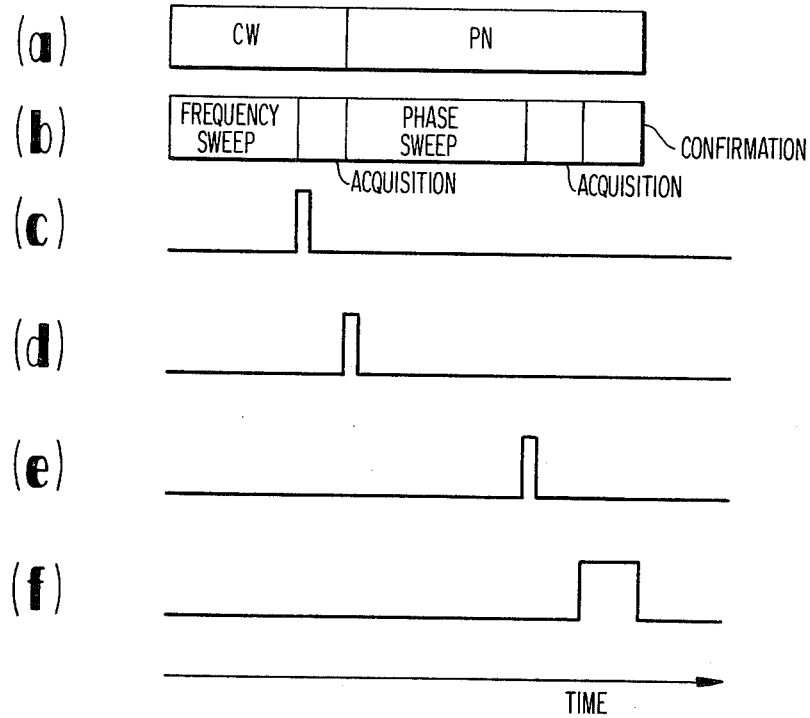
Figure 4:
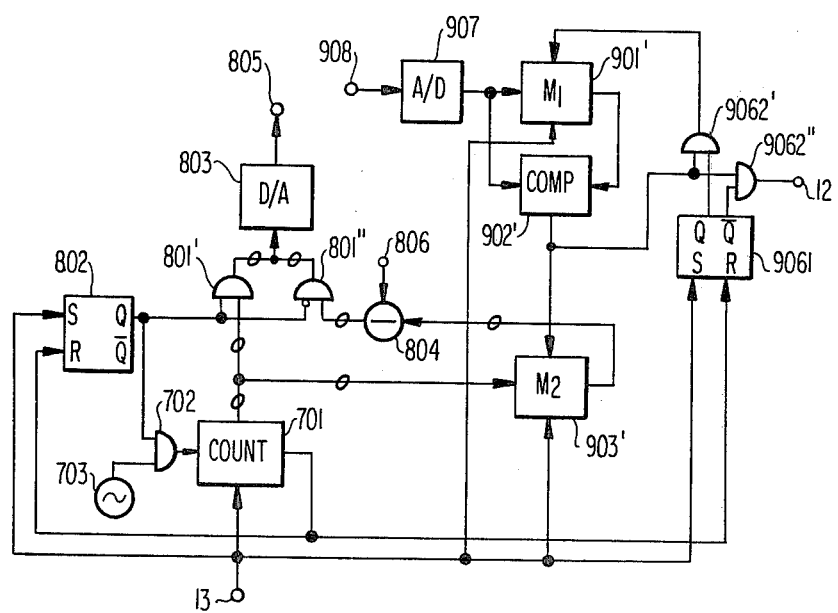

Now the invention will be described in greater detail in conjunction with the accompanying drawings, in which:

FIG. 1 shows a block diagram of one embodiment of the present invention;

FIG. 2 shows a waveform diagram for explaining the operations of a level detector 6, a sweep voltage generator 7 and a memory circuit 9;

FIG. 3 shows a timing chart of the timing of a received signal and operation switching pulses in the embodiment of FIG. 1; and FIG. 4 shows a block diagram of an alternative example of several structural elements of FIG. 1.

A first embodiment of the present invention illustrated in FIG. 1 will be described by referring to FIGS. 2 and 3.

In FIG. 1, a carrier (continuous sine wave—CW in FIG. 3(a)) is transmitted as the TDMA initial acquisition signal from a transmitter side (not shown), and subsequently, a modulated signal, obtained by phase-modulating said carrier with a PN (pseudorandom noise) code having a period equal to one frame, is transmitted.

On a receiver side, frequency acquisition is effected at first by employing the incoming carrier CW from the transmitter side, subsequently the phase acquisition is effected by employing the received PN code, then the delay time between the transmitting and receiving stations is estimated by detecting the time shift of the initial pattern contained in the acquired PN code with respect to the corresponding pattern in the PN code used on the transmitter side, and this delay time is applied to the transmitter side so that a transmission can be made at the correct time.

In FIG. 3 (b) is shown the detection process of the initial acquisition signal.

To an input terminal 1 of FIG. 1 is applied the initial acquisition signal together with noise and interference signals. At first, the process of the frequency acquisition will be described. A frequency converter 2 converts the input signal into an intermediate frequency signal by employing the output signal of a voltage-controlled oscillator (VCO) 3 as a local signal. A multiplier 4 multiplies the output signal of a PN code generator 5, which is essentially a waveform generator, by the intermediate frequency signal obtained from the frequency converter 2. As will be described later, upon frequency acquisition the output signal of the PN code generator 5 is held at a fixed value. A level detector 6 composed of a band-pass filter 601, an amplifier 602 and a detector 603 operates to detect a high level when the frequency of the intermediate frequency signal coincides with the center frequency of the band-pass filter 601. A sweep voltage generator 7 connected to a control terminal of the oscillator 3 via a switching circuit 8 functions as a circuit for generating a saw-tooth wave signal by which the oscillation frequency of the VCO3 is linearly varied. A memory circuit 9 stores the sweep voltage at the moment when the output signal of the level detector 6 takes the maximum value. This memory circuit 9 consists of memories ($M_1$, $M_2$ and $M_3$) 901, 903 and 904, a comparator 902 and switching circuits 905 and 906.

In the frequency acquisition state, the switching circuit 905 connects the comparator 902 with the memory 903, while the switching circuit 906 connects the comparator 902 with the memory 901. The output signal of the level detector 6 is applied to an input terminal of the memory 901 and one input terminal of the comparator 902, and to the other input terminal of the comprator 902 is applied an output signal from the memory 901. The comparator 902, for comparing the magnitudes of the respective inputs, generates a write-in pulse when the outputsignal of the level detector 6 is larger than that of the memory 901. This write-in pulse is simultaneously fed to a write control terminal of the memory 901 via the switching circuit 906 and to a write control terminal of the memory 903 via the switching circuit 905, and thereby the contents of these memories are renewed according to the inputs at this moment. In this way, the maximum value of the input signal, applied up to that moment during the voltage sweep period by the sweep voltage generator 7, is always stored in the memory 901. On the other hand, to the input terminal of the memory 903 is applied an output signal from the sweep voltage generator 7 so that the sweep voltages, at the time points when the write-in pulses are generated, are successively stored in that memory. In other words, after the sweeping has been completed, the maximum value of the output signal of the level detector 6 during the entire sweep period is stored in the memory 901, and the sweep voltage at the moment when the maximum value has occurred is stored in the memory 903. In this figure, reference numeral 8 designates a switching circuit containing a switch 801 and a flip-flop 802, which serves to switch the control voltage, fed to the control terminal of the VCO 3, between the output signal of the sweep voltage generator 7 and the output signal of the memory 903. A terminal 13 is an input terminal for producing an operation start signal, which is fed to reset terminals of the memories 901, 903 and 904 and to set terminals of the flip-flops 802, 9051 and 9061 to bring the respective elements to their initial states. The start signal is also applied to the generator 7 to command the generator 7 to start sweeping, and further it resets a counter 503 and a counter 142 of a timer 14. The timer 14 is composed of a high speed clock 141, a counter 142 adapted to count the clock pulses fed from the clock 141, comparators 143 and 144 for generating time-up pulses, respectively, whem the count in the counter 142 reaches predetermined values, and a comparator 145 for producing a phase acquisition end signal when the count in the counter 142 exceeds a predetermined value. The timer 14 functions to measure a time lapse from the operation start time, so that after a predetermined time lapses the operation of the present system may be switched from frequency acquisition to phase acquisition and further to acquisition confirmation, and furthermore, it functions to generate an acquisition confirmation start signal. Under the frequency sweep condition, the flip-flop 802 has its Q-terminal set to "1", and at this time point the switch 801 is adapted to select the side of the generator 7. Under the same sweep condition, the flip-flops 9051, 9061 and 151 also have their Q-terminals set to "1" so that the switches 9052, 9062 and 152, respectively, select the memory 903, the memory 901 and a counter 16. A counter 161 in the counter 16 is held stopped at the count of "0, 0, 0, ..., 0" until a start pulse from the comparator 143 goes to the counter 16, and the counter 503 is also held stopped at the count of "0, 0, 0, ..., 0" until a clock 504 starts to operate so that a value stored at the address "0, 0, 0, ..., 0" of an ROM (read only memory) 502 is applied to a D/A converter 501, and thereby the output signal of the PN code generator 5 is held at a fixed value. Upon completion of the sweeping operation, an end pulse (FIG. 3(c)) is delivered from the generator 7 to reset the flip-flop 802 so that the Q-terminal of the flip-flop 802 is set to "0" and as a result, the switch 801 selects the memory 903. Consequently, the frequency of the VCO 3 is locked at the frequency for which the output signal of the level detector 6 takes the maximum value, in other words, at such a local frequency that a signal presumed most probably to be an input signal may be converted into an intermediate frequency signal having a predetermined frequency (that is, the center frequency of the band-pass filter 601).

The completion of the frequency acquisition can be determined on the basis of the fact that a predetermined time has elapsed from the operation start point, using the comparator 143 in the timer 14. This amount of lapsed time is set as the period up to the time when the frequency acquisition operation is finished and the initial acquisition signal changes from the carrier (CW in FIG. 3(a)) to the modulated signal that is phase-modulated with the PN code (PN in FIG. 3(a)). An soon as the count in the counter 142 indicates the aforementioned period, the comparator 143 provides a start pulse for switching the frequency acquisition operation to the phase acquisition operation (FIG. 3(d)). In response to this switching pulse, the clock 504 starts its operation. Simultaneously, the clock 160 starts its operation so that the counter 161 may start the counting of a phase sweep quantity. In addition, the pulse from the comparator 143 is simultaneously fed to the switching circuit 905 to reset the flip-flop 9051. Then, the switch 9052 transfers its selection from the memory 903, selected by that time, to the memory 904. Also, the contents of the memory 901 are reset by the pulse from said comparator 143.

Now the operation of the frequency acquisition as described above will be explained in more detail with reference to the waveform diagram of FIGS. 2 (a), (b), (c), (d) and (e) for representing the operation states of the respective portions of FIG. 1 along the same time axis. A control voltage indicated by a solid line 20 is shown in FIG. 2(a). This control voltage varies linearly during the sweep period. FIG. 2(b) shows changes in frequencies of the respective signals with respect to time, and dotted lines 23 and 25 represent frequencies of first and second interference signals, respectively, and solid lines 24 and 26 respectively represent the input frequency of the frequency converter 2 and the output frequency of the VCO3, that is, the frequency of the local signal. Frequencies of the intermediate frequency signals at the intermediate frequency output terminal of the frequency converter 2 are indicated in FIG. 2(c) by dotted lines 27 and 29 representing the frequencies of the intermediate frequency signals converted from the first and second interference signals, respectively, and a solid line 28 representing the frequency of the intermediate frequency signal converted from the input signal. In addition, a dot-dash line 30 in this figure represents the center frequency of the band-pass filter 601. FIG. 2(d) shows by a waveform 31 the time change of the level detected by the level detector 6. This detected level shows peak values when the frequencies of the intermediate frequency signals derived from the input signal and the interference signals coincide with the center frequency of the band-pass filter 601. More particularly, at the time points when the solid line 28 and the dotted lines 27 and 29 intersect with the dot-dash line 30 of FIG. 2(c), the detected level shows the peak values. These peak values are designated by reference numerals 32, 33 and 34 in FIG. 2(d). At the portions of the detected level other than these peak portions, only a random change caused by noises appears in the detected level. It can be said that it is most probable to presume from the detected level that the signal producing the highest peak vaue 33 is the desired signal. A solid line 35 of FIG. 2(e) shows the maximum value stored in the memory 901. In the memory circuit 9, as soon as the first peak value 32 appears, a write-in pulse is generated from the comparator 902, and thereby, that peak value and the sweep voltage at that time point (=control voltage, i.e., the value represented by a point 21 in FIG. 2(a)) are written in the memories 901 and 903, respectively. Also, when the next peak value 33 comes out, the same operation is carried out so that the maximum value and the sweep voltage in the memories 901 and 903, respectively, are rewritten. However, upon appearance of the next subsequent peak value 34, the above referred write-in pulse is not generated, since this peak value is smaller than the maximum value that has been already stored. As a result, the renewal of the memory contents is not performed. In this way, eventually the sweep voltage represented by a point 22 of FIG. 2(a) is stored in the memory 903, so that, after the completion of the sweeping, this stored voltage is applied to the control terminal of the VCO 3 as a control voltage. Consequently, the frequency of the intermediate frequency signal derived from the input signal represented by the solid line 28 of FIG. 2(c) coincides with the frequency represented by the dot-dash line 30, and so, the locking of the frequency can be achieved. As will be apparent by reference to the above description, according to the present invention, the risk of being wrongly locked by the first interference signal can be reduced. Furthermore, by narrowing the pass band of the band-pass filter 601, the S/N ratio can be well improved, eliminating the effect due to noises. In addition, because of the adoption of the maximum value detection method, the present system is not affected by the overal variation of the level. Still further, even with respect to a signal whose frequency is indefinite over a broad range, the frequency acquisition can be carried out without degrading the S/N ratio.

Now the phase acquisition operaion occurring when the initial acquisition signal changes to a modulated signal (PN in FIG. 3(a)) will be described next. During phase acquisition operation, since the control terminal of the VCO 3 is supplied with a fixed control voltage fed from the memory 903, the frequency of the input signal from the frequency converter 2 to the multiplier 4 is not changed. The input signal that is phase modulated with the PN code (PN in FIG. 3(a)) is converted into an appropriate intermediate frequency by the frequency converter 2, and then, multiplied by the signal fed from the PN code generator 5 in the multiplier 4. During the phase acquisition operation the level detector 6 functions as a correlator for obtaining a correlation between the input PN code and the PN code generated by the PN code generator 5. In the PN code generator 5, the output signal of the high speed clock oscillator 504 is applied to the input terminal of the counter 503 and, as a result, a digital saw-toth wave is generated from the counter 503. If a fixed value is added to this digital saw-tooth wave in a digital adder 10, the sum reaches the crest of the saw-tooth wave (all the digits in the digital code being "1") earlier by the corresponding time. Accordingly, at the next moment the digital code is restored to zero such that (1111 .... 1111) → (0000 . ... 0000), and then the waveform begins to rise again. In other words, depending upon the constant applied to the adder 10, the quantity or amount of phase advance of the output wave from the PN code generator 5 can be controlled. The output signal of the adder 10 is supplied to the ROM 502 as an address so that a digital code of the output value to be obtained when the addresses of (0000 ... 0000) to (1111 ... 1111) are made corresponding to one period of a known periodic waveform (PN code), may be outputted from the ROM 502. The output signal of the ROM 502 is converted into a continuous waveform (an analog waveform) by the D/A converter 501 so as to serve as the output signal of the PN code generator 5.

As described previously, for the phase acquisition operation the switching circuit 905 connects the comparator 902 to the memory 904, and the output signal of the correlator 6 has its maximum value stored in the memory 901 similarly to the case of the frequency acquisition operation. The phase of the PN code generator 5 is determined by the count in the counter 16 serving as a sweeper for successively varying the constant value fed to the adder 10. The adder 10 and the counter 16 jointly form phase shift means. More clearly, the clock 160 of the counter 16 functions to decide the sweep speed, and the counter 161 decides the phase shift quantity. In addition, through a similar process to the frequency acquisition operation, the count in the counter 161 at the moment when the output signal of the correlator 6 takes the maximum value is stored in the memory 904. When the output phase of the PN code generator 5 has been varied by one period or more, the count in the counter 142 becomes equal to a value set in the comparator 144, and then, the comparator 144 provides a phase sweep end pulse (FIG. 3(e)). This pulse is sent to a reset terminal of the flip-flop 151 in the switching circuit 15 so that the Q-terminal of the flip-flop 151 is set to "0". Thereby, the switch 152 connects the memory 904 to the adder 10. Consequently, the generator 5 is fixed in the phase existing at the moment when the correlation between the generated PN code and the input signal had its maximum value, and thus, the phase acquisition becomes completed.

In addition, the phase sweep end pulse generated from the comparator 144 resets the flip-flop 9061 in the switching circuit 906, and by resetting the Q-terminal of the flip-flop 9061 to "0", the switch 9062 is operated to switch the output signal of the comparator 902 from the memory 901 to the input terminal of the acquisition confirmation signal generator 11. Furthermore, in response to the lapse of a predetermined period of time, the timer 14 generates an acquisition confirmation start signal (FIG. 3 (f)) as the output signal of the comparator 145 so that it may be fed to said generator 11. In this generator 11 consisting of an AND gate 111, an acquisition confirmation signal is generated when the generator 11 has received from comparator 902 a write-in pulse indicating that a value larger than the value stored in the memory 901 has been obtained at the output terminal of the correlator 6, and when said acquisition confirmation start signal (FIG. 3(f)) is fed from the timer 14. The acquisition is confirmed in the following manner. Since the detection of the correlation quantity in the correlation 6 is done by integrating the carrier component of an output signal from the multiplier 4 via the band-pass filter 601, the correlation quantity is subjected to peak loss corresponding to the phase change of the PN code generator 5 in the case where the maximum value of the correlation quantity is obtained by sweeping the phase of the generator 5. However, in the case where the phase of the PN code generator has been restored to a correct phase after the completion of the sweeping, the above-mentioned peak loss is not generated because the maximum correlation quantity is obtained stationarily. Consequently, a larger value of the correlation than the value stored in the memory 901 during the phase sweep operation is detected, and therefore, the acquisition confirmation signal can be generated in the above-described manner. However, in the case of the failure of the frequency acquisition or the phase acquisition operations, the phase can not be acquired correctly with the result that the maximum value of the noises is stored in the memory 901. On the other hand, the output signal of the correlator 6, after the completion of the phase sweep, presents random values. Accordingly, in the case of not correctly acquiring the phase, the contents of the memory 901 become larger than the output signal of the correlator 6 after the generation of the phase acquisition operation end signal, so that the write-in pulse fed from the comparator 902 can not be generated, and accordingly, the acquisition confirmation signal can not be derived. At the acquisition confirmation stage in the illustrated embodiment, the maximum value stored in the memory 901 and the output signal of the correlator 6 have been compared with each other, but in general, the maximum value stored in the memory 901 multiplied by a certain factor (smaller than 1 and larger than 0) and the output signal of the correlator 6 are compared with each other. In the embodiment, this factor is specifically selected at "1".

Referring to FIG. 4 which shows an alternative example of the portions corresponding to the structural elements 7, 8 and 9 of the first embodiment of FIG. 1, the on a signal line signifies that the signal line is provided in multiple. In this embodiment, the sweep voltage generator 7, the memory circuit 9 and the switching circuit 8 of FIG. 1 are realized with digital elements so that structural elements 701, 702 and 703 form the sweep voltage generator, structural elements 901', 902', 903', 907, 908, 9062', 9062" and 9061 form the memory circuit, and structural elements 801', 801", 802, 803, 804, 805 and 806 form the switching circuit. To a terminal 908 serving as an input terminal the output signal of the level detector 6 is applied, and is then converted into a digital value by an A/D converter 907. Other structural elements 901', 902', and 903' of the memory circuit correspond to those elements 901, 902 and 903, respectively, in the first embodiment of FIG. 1, and they are essentially equivalent to each other except for the point that the operation is carried out by digital processing. In addition, the switching circuit 906 of FIG. 1 is formed by the flip-flop 9061 and the AND gates 9062' and 9062". When the flip-flop 9061 is set and its Q-terminal is held at "1", the gate 9062' is opened and the gate 9062" is closed. Whereas, under the condition of the Q-terminal held at "0", the gate 9062' is closed and the gate 9062" is opened. From this, it is obvious that the elements 9061, 9062' and 9062" jointly achieve the same function as the switching circuit 906 of FIG. 1. The elements 701, 702 and 703 forming the sweep voltage generator 7 of FIG. 1 are a counter, an AND gate and a clock oscillator, respectively. The counter 701 is reset by a sweep start signal given to the terminal 13, and then, starts count-up as driven by a clock signal fed from the clock oscillator 703 by the actions of the flip-flop 802 and the gate 702. Output signals fed from the respective digit positions of the counter 701 are given to the D/A converter 803 via the gate 801', and after the conversion of said output signals into a gradually increasing step-shaped voltage, a converted output signal is generated from the terminal 805. This step-shaped voltage corresponds to the saw-tooth wave sweep voltage shown in FIG. 2(a). Subsequently, as the count-up proceeds until the count reaches the upper limit of the counter 701, a carry pulse is given from the counter 701, and this pulse serves as a sweep end pulse to reset the flip-flop 802. Then, a Q-output signal of the flip-flop 802 opens the gate 801" to give an output signal of the digital memory 903' to the D/A converter 803. At this moment, the output signal of the digital memory 903' is supplied to the D/A converter 803 after a fixed value fed to the terminal 806 has been subtracted from said output signal in the digital subtractor 804. This subtractor is carried out in order to compensate for the delay through the circuit (through the circuit elements 7, 8, 3, 2, 6 and 9) from the generation of the sweep voltage at which the maximum value arises up to the actual observation of the maximum value.

For one preferred embodiment of the present invention mentioned above, alternatively the present invention can be practiced in such a manner that a phase acquisition circuit for acquiring only the phase is formed by employing only the structural elements 1, 4, 5, 6, 9, 10 and 16 of FIG. 1, and in case a frequency variation is small, only the phase acquisition is effected by making use of this phase acquisition circuit to initiate the transmission of a burst signal. In this case, the switching circuit 905 and the memory 903 in the memory circuit 9 of FIG. 1 are unnecessary, and the output signal of the comparator 902 is given to the switching circuit 906 and the memory 904. Also, after the completion of the phase acquisition, if the switching circuit 906 is switched to fix the contents of the memory 901 and to observe the output signal of the comparator 902, the phase acquisition can be confirmed by determining that the phase acquisition has been performed correctly only in case that the write-in pulse is delivered.

Although the acquisition confirmation in the above-described embodiment is determined by one operation, if the acquisition confirmation signal is observed for as long a time as possible and is subjected to statistical treatment, such as integration, the precision of the confirmation can be further enhanced. With regard to a circuit construction, this method can be practiced, for example, by means of a low-pass filter and a comparator for determining whether or not the output signal of the low-pass filter has exceeded a certain threshold value.

It is evident that in the embodiment of FIG. 1, if the output signal of the correlator 6 is subjected to A/D conversion, the structural elements in the memory circuit 9 can be composed of digital elements similarly to the case shown in FIG. 4. Furthermore, it is possible to effect the control of the structural elements 5, 7, 8, 9, 10, 11, 14, 15 and 16 in FIG. 1 with a micro-processor by A/D converting the output signal of the correlator 6.

Moreover, in the above-described embodiment, explanation has been given assuming that a global beam antenna is utilized, where a transmitting station can receive its own transmitted electromagnetic wave via a satellite. When a spot beam antenna is utilized in its place, where an electromagnetic wave repeated via a satellite can not be received by the transmitting station, an earth station which is going to start a communication, transmits an initial acquisition signal to a monitor station in another zone (a zone where the electromagnetic wave from the transmitting station can be received) via the satellite to have the monitor station measure the deviation from the inherent TDMA frame. The monitor station then transmits the magnitude of the deviation to the earth station which is going to start a communication via the satellite, and the earth station arranges the timing of transmission based on that information and transmits the data at correct time slots. Even upon such an initial acquisition with the spot beam antenna, the monitor station must receive a minute signal and detect the phase difference similarly to the case of employing the global beam antenna, and therefore, the application of the TDMA initial acquisition signal detection system according to the present invention becomes more effective.

As described above, the present invention ensures a correct initial acquisition even under the condition of a low signal-to-noise ratio and signal level fluctuation.

What is claimed is:

1. A time-division multiple-access initial acquisition signal detection system including a phase acquisition circuit which detects a phase difference between an input periodic waveform of said initial acquisition signal and an output signal of a waveform generator for generating the same periodic waveform as said input periodic waveform and which comprises: correlation means for detecting a mutual correlation quantity between said input periodic waveform and the output signal of said waveform generator; phase shift means for shifting the output phase of said waveform generator; detection means for simultaneously detecting the maximum value of an output signal obtained from said correlation means and the phase shift quantity of said waveform generator which produced said maximum value when the phase has been shifted by one period or more with said phase shift means; and means for correcting the phase of said waveform generator by said phase shift quantity, whereby the phase error between said input periodic waveform and the output waveform of said waveform generator may be estimated on the basis of said phase shift quantity, and the phase acquisition synchronized with said input periodic waveform may be performed by correcting the phase of said waveform generator by said phase shift quantity.

2. A time-division multiple-access initial acquisition signal detection system as claimed in claim 1, wherein said correlation means comprises:
means for multiplying said input waveform and said generator output signal to produce a product signal; and
means for integrating the product signal and producing said output signal of said correlator means.

3. A time-division multiple-access initial acquisition signal detection system, comprising: a frequency acquisition circuit in which, in order to acquire a desired intermediate frequency derived from said initial acquisition signal, the level of said desired intermediate frequency is detected while sweeping a local oscillation frequency, said local oscillation frequency at the moment when said level takes the maximum value is stored, and, after the completion of the sweep of said local oscillation frequency, the oscillation frequency of the local oscillator is returned to the stored local oscillation frequency; a phase acquisition circuit including correlation means for detecting a mutual phase correlation quantity between an input periodic waveform of said initial acquisition signal and an output waveform of a waveform generator for generating the same periodic waveform as said input periodic waveform to detect a phase difference between said input periodic waveform and the output waveform of said waveform generator, phase shift means for varying the output phase of said waveform generator, detection means for simultaneously detecting the maximum value of the output signal obtained from said correlation means and the phase shift quantity which produced said maximum value when the phase has been shifted by one period or more by said phase shift means, and means for correcting the phase of said waveform generator by said phase shift quantity, whereby the phase error between said input periodic waveform and the output waveform of said waveform generator may be estimated on the basis of said phase shift quantity, and the phase acquisition synchronized with said input periodic waveform may be performed by correcting the phase of said waveform generator by said phase shift quantity; and an acquisition confirmation circuit in which upon completion of said phase acquisition, a comparison is made between the maximum level detected by said correlation means during the phase shifting effected by said phase shift means multiplied by a predetermined factor and the output level of said correlation means after said phase acquisition, and if the output level of said correlation means is determined to be higher, the phase acquisition is confirmed, resulting in the generation of an acquisition confirmation signal.

4. A time-division multiple-access initial acquisition signal detection system as claimed in claim 3, further characterized in that said frequency acquisition circuit functions as a circuit for converting the frequency of said initial acquisition signal into a predetermined intermediate frequency by employing the output frequency of the local oscillator as the local oscillation frequency, and including a voltage-controlled oscillator employed as said local oscillator; level detection means for detecting the level of the signal converted into said intermediate frequency; sweep voltage generator means connected to a control terminal of said oscillator and generating a control voltage for sweeping the local oscillation frequency of said oscillator; memory means for storing the sweep voltage at the moment when said level detection means has detected the maximum value of the converted signal during the voltage sweeping period of said sweep voltage generator means; and switching means for applying a control voltage, derived from the sweep voltage stored in said memory means, to the control terminal of said oscillator after the completion of the voltage sweeping of said sweep voltage generator means.

5. In a satellite communication system, a time-division multiple-access initial acquisition signal detection system including a receiving earth station, and comprising:
means for receiving from the satellite an incoming initial acquisition signal transmitted from earth and consisting of a first continuous-wave signal portion and a second phase-modulated signal portion;
frequency converter means including variable frequency local oscillator means for converting the received signal to an intermediate frequency signal;

band-pass filter means for passing only a predetermined narrow band of signal frequencies;

sweep means for linearly sweeping the frequency of said oscillator means during a frequency sweep period;

means for continuously storing the maximum level of said first signal portion passed by said filter means during a frequency sweep;

means for locking, after a sweep period, the frequency of said local oscillator means at the frequency which produced the maximum level of said first signal portion;

variable phase signal generator means for producing a local phase-modulated signal of the same waveform as said second signal portion;

means for multiplying the converted second signal portion by said local phase-modulated signal to produce a composite signal;

means for shifting the phase of said local phase-modulated signal during a phase sweep;

means for continuously storing the maximum level of said composite signal during a phase sweep; and means for correcting, after a phase sweep, the phase of said generator means by the amount of phase shift which produced the maximum level of the composite signal, thereby making the phase of the local phase-modulated signal equal to that of the incoming second signal portion, said amount of phase shift providing a basis for acquiring in the TDMA frame at the satellite the correct time slot, taking into account actual propagation delay time.

6. A time-division multiple-access initial acquisition signal detection system as claimed in claim 5, further comprising phase acquisition confirmation means comprising:

comparator means for comparing a signal level derived from the maximum stored level of the composite signal with the level of a later incoming signal passed by said filter means after the phase of said generator means has been locked; and means for generating an acquisition confirmation signal when the level of the later signal exceeds the level derived from the maximum stored composite signal.

7. A time-division multiple-access initial acquisition signal detection system as claimed in claim 5, wherein said local oscillator means comprises a voltage-controlled oscillator having a control terminal and wherein said sweep means comprises a sawtooth voltage generator connected to said control terminal.

* * * * *